United States Patent
Becher et al.

(10) Patent No.: US 11,859,417 B2
(45) Date of Patent: Jan. 2, 2024

(54) LOCKING DEVICE FOR CAR DOORS

(71) Applicants: INTEVA FRANCE SAS, Sully sur Loire (FR); Marquardt GmbH, Rietheim-Weilheim (DE)

(72) Inventors: Andreas Becher, Villingen-Schwenningen-Obereschach (DE); Achim Mink, Deißlingen (DE); Oliver Huppenbauer, Villingen-Schewenningen (DE); Jean-Marc Belmond, Saint-Jean le Blanc (FR); Pascal Philippe, Meurthe (FR)

(73) Assignees: INTEVA FRANCE SAS, Sully sur Loire (FR); MARQUARDT GMBH, Rietheim-Weilheim (DE)

( * ) Notice: Subject to any disclaimer, the term of this patent is extended or adjusted under 35 U.S.C. 154(b) by 27 days.

(21) Appl. No.: 17/493,614

(22) Filed: Oct. 4, 2021

(65) Prior Publication Data
US 2022/0025683 A1 Jan. 27, 2022

Related U.S. Application Data

(63) Continuation of application No. PCT/IB2019/000369, filed on Apr. 2, 2019.

(51) Int. Cl.
*E05B 81/78* (2014.01)
*B60R 25/24* (2013.01)
(Continued)

(52) U.S. Cl.
CPC .............. *E05B 81/78* (2013.01); *B60R 25/24* (2013.01); *E05B 81/77* (2013.01); *G07C 9/00309* (2013.01); *G07C 2209/64* (2013.01)

(58) Field of Classification Search
None
See application file for complete search history.

(56) References Cited

U.S. PATENT DOCUMENTS

| 4,848,031 A | 7/1989 | Yamagishi et al. |
| 10,480,221 B2 | 11/2019 | Cumbo |

(Continued)

FOREIGN PATENT DOCUMENTS

| CN | 109281559 A | 1/2019 |
| DE | 102007042612 A1 | 3/2009 |

(Continued)

OTHER PUBLICATIONS

International Search Report for International Application No. PCT/IB2019/000369; Application Filing Date: Apr. 2, 2019; dated Jan. 23, 2020; 5 pages.

(Continued)

*Primary Examiner* — Carlos Garcia
(74) *Attorney, Agent, or Firm* — CANTOR COLBURN LLP

(57) ABSTRACT

A locking device for car doors without door handles, including: an electronic control unit for authorization of access, the electronic control unit being connected to one or more sensors and/or to an antenna for wireless communication for communication with a smart device; and a driven mechanical lock/or unlock unit including a latching element for latching a closed end position of a car door, wherein the latching element is provided to block an intermediate position of the car door, into which the car door is movable dependent on a correct access authorization and wherein the intermediate position of the car door enables a grip behind an outside surface of the car door to unlock the intermediate position of the car door and to allow further movement of the car door into an open end position.

11 Claims, 2 Drawing Sheets

(51) Int. Cl.
    *E05B 81/76*     (2014.01)
    *G07C 9/00*     (2020.01)

(56) References Cited

U.S. PATENT DOCUMENTS

| | | | |
|---|---|---|---|
| 10,711,504 | B2 | 7/2020 | Roos et al. |
| 2016/0208538 | A1* | 7/2016 | Nishikibe ............... E05F 15/40 |
| 2018/0051502 | A1 | 2/2018 | Roos et al. |
| 2018/0238099 | A1* | 8/2018 | Schatz ................. E05F 15/622 |
| 2019/0024421 | A1 | 1/2019 | Cumbo |
| 2020/0181966 | A1* | 6/2020 | Kato ........................ B60R 3/02 |
| 2020/0262388 | A1* | 8/2020 | Maddelein ............. E05F 15/76 |
| 2022/0025682 | A1* | 1/2022 | Becher .................... E05B 81/20 |
| 2022/0144207 | A1* | 5/2022 | Maddelein ............. E05B 81/78 |

FOREIGN PATENT DOCUMENTS

| | | |
|---|---|---|
| DE | 102017214174 A1 | 2/2018 |
| DE | 102018117477 A1 | 1/2019 |

OTHER PUBLICATIONS

Written Opinion for International Application No. PCT/IB2019/000369; Application Filing Date: Apr. 2, 2019; dated Jan. 23, 2020; 9 pages.

\* cited by examiner

LOCKING DEVICE FOR CAR DOORS

CROSS REFERENCE TO RELATED APPLICATIONS

This application is a continuation application of PCT/IB2019/000369, filed Apr. 2, 2019, the entire contents of which are incorporated by reference thereto.

TECHNICAL FIELD

The present disclosure relates to a locking device for a car locking system.

BACKGROUND

Since some years the keyless access of cars is triggered by a sensor in a door handle, which the user has to touch to unlock the door. Therefore an electronic module with a touch sensor is integrated into the door handle, which has an electrical interface to an electronic control unit for access control to communicate the touch event to the electronic control unit for access control.

Furthermore movable car handles are known to build a flat outside surface of the car door in the closed and locked position.

BRIEF SUMMARY

An object of the present present disclosure is to provide a locking device, which can be operated without any door handle.

Disclosed is a locking device for car doors without door handles, including: an electronic control unit for authorization of access, the electronic control unit being connected to one or more sensors and/or to an antenna for wireless communication for communication with a smart device; and a driven mechanical lock/or unlock unit including a latching element for latching a closed end position of a car door, wherein the latching element is provided to block an intermediate position of the car door, into which the car door is movable dependent on a correct access authorization and wherein the intermediate position of the car door enables a grip behind an outside surface of the car door to unlock the intermediate position of the car door and to allow further movement of the car door into an open end position.

According to the present disclosure instead of a movable handle there is a latched intermediate position of the car door, into which the door is moved depending on a correct access authorization and which allows to grip behind the outside surface of the door, i.e. into a gap between the door and the car body. Since this intermediate position is latched, it is a safe position. The car door cannot push against obstacles like other cars, walls, etc., if there is not enough space to open the door.
Accidents for example collisions with passing cyclist are prevented because the car door cannot open surprisingly, but is latched in the intermediate position.

The final opening of the door can be executed by an authorized person, who can grip behind the door, unlock the intermediate position and bring then the door into the open end position i.e. by manually pulling, pushing a drive button, etc.

Preferably there are an electronic control unit and driving means to move the car door from the closed end position into the intermediate position. Since in the closed end position there is no possibility for a user to pull the door, since there is no car handle, the user must first initiate the authorization to access, i.e. by a NFC-communication, a radio transmitter and/or a proximity sensor for a car key or another keyless entry system. Then the control unit initiates the movement of the car door into the intermediate position by the driving means. In this position the user is able to unlatch and open the door completely. Since the intermediate position first is latched the movement into this door position is safe, i.e. against any
damage caused by objects in the environment of the car door like walls, other cars or passing persons, cyclists, etc.

Advantageously an electronic control unit is provided to initiate the movement of the car door from the closed end position into the intermediate position dependent on an
appearing proximity signal and a correct access authorization.

Advantageously driving means are provided to move the car door from the intermediate position into the open end position and/or from the open position into the closed end position. This feature increases the comfort for the user, because this movements are then executed automatically. This movements can be started by another sensor operation, by a short pulling of the door or other actions.

In an enhancement of the present disclosure there are driving means and a control unit to move the car door from the intermediate position into the closed end position. This is important in the situation when there is no further operation of the car door in the intermediate position. Closing again in this case can be
controlled dependent on defined closing criteria.

Such a criteria can be a time interval without manually door movement, a disappearing proximity signal, an operation of a close sensor, a closing signal via NFC-communication, etc.

Any door movement can be driven by a motor, especially an electric motor, or energy storage devices like a spring, an air bottle, etc.

In a further enhancement of a car locking device, especially according to the present disclosure a control unit is adopted to generate an acoustic and/or light signal to indicate that the car door is moving into or located in the intermediate position. This signal enables a user to note, that the opening routine of the car is started or that the car is not totally closed when he is nearing or leaving the car.

A further improvement of this embodiment has the signaling device located in the area of the narrow side of the door, which is only noticeable in the intermediate position of the car door. For example the signal device has a light source and a control unit for generating at least one light signal, which is only visible in the intermediate position of the car door.

In this location of the signaling device it is ensured, that the car door is indeed in the intermediate position when the signal is noted. Furthermore the signal device is located in a shielded area.

To enhance the protection against outer influence in the closed end position of the car door, the area of the signal device can be sealed in the closed end position of the car door.

In an appropriate position of the signal device the sealing can be achieved without a separate sealing only by the regular door sealing in the closed end position.

BRIEF DESCRIPTION OF THE FIGURES

An embodiment of the present disclosure is shown in the drawings.

In detail show

DETAILED DESCRIPTION

Figure 1:
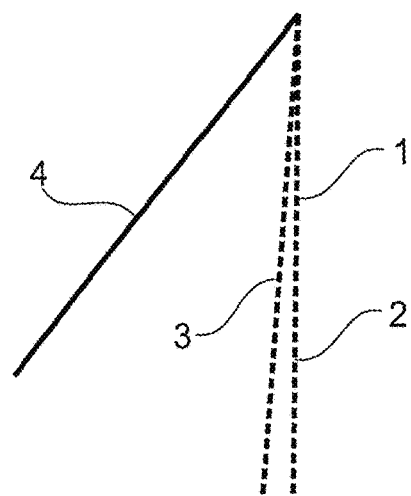
FIG. 1 a schematic illustration of three different door positions.
Figure 2:
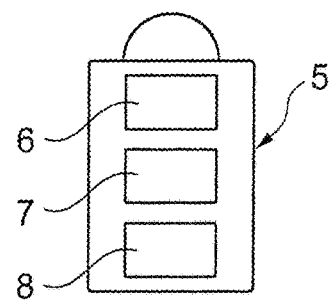
FIG. 2 a schematic drawing of a car key.
Figure 3:
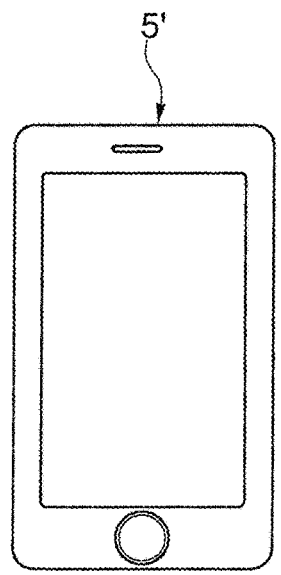
FIG. 3 a schematic drawing of a smartphone.

The car door 1 in FIG. 1 is shown in three positions 2, 3, 4, the closed end position 2, the intermediate position 3 and the open end position 4.

The car key 5 has different buttons, i.e. one button 6 to open the driver door, one button 7 for the trunk and one button 8 to close the car. The functions of this key can also be realized in a smartphone 5', a smart card, etc. When the button 6 is pushed the control unit of the locking device releases the closed end position 2 and starts the movement of the car door 1 into the latched intermediate position 3. In the intermediate position 3 the car door 1 can be unlatched and pulled into the open end position 4 without a door handle.

In improved versions the movements of the car door 1 are partially or completely operated automatically by driving means.

Also the intermediate position 3 can be unlatched automatically by a control unit, i.e. when the key button 6 is pushed again.

Figure 4:
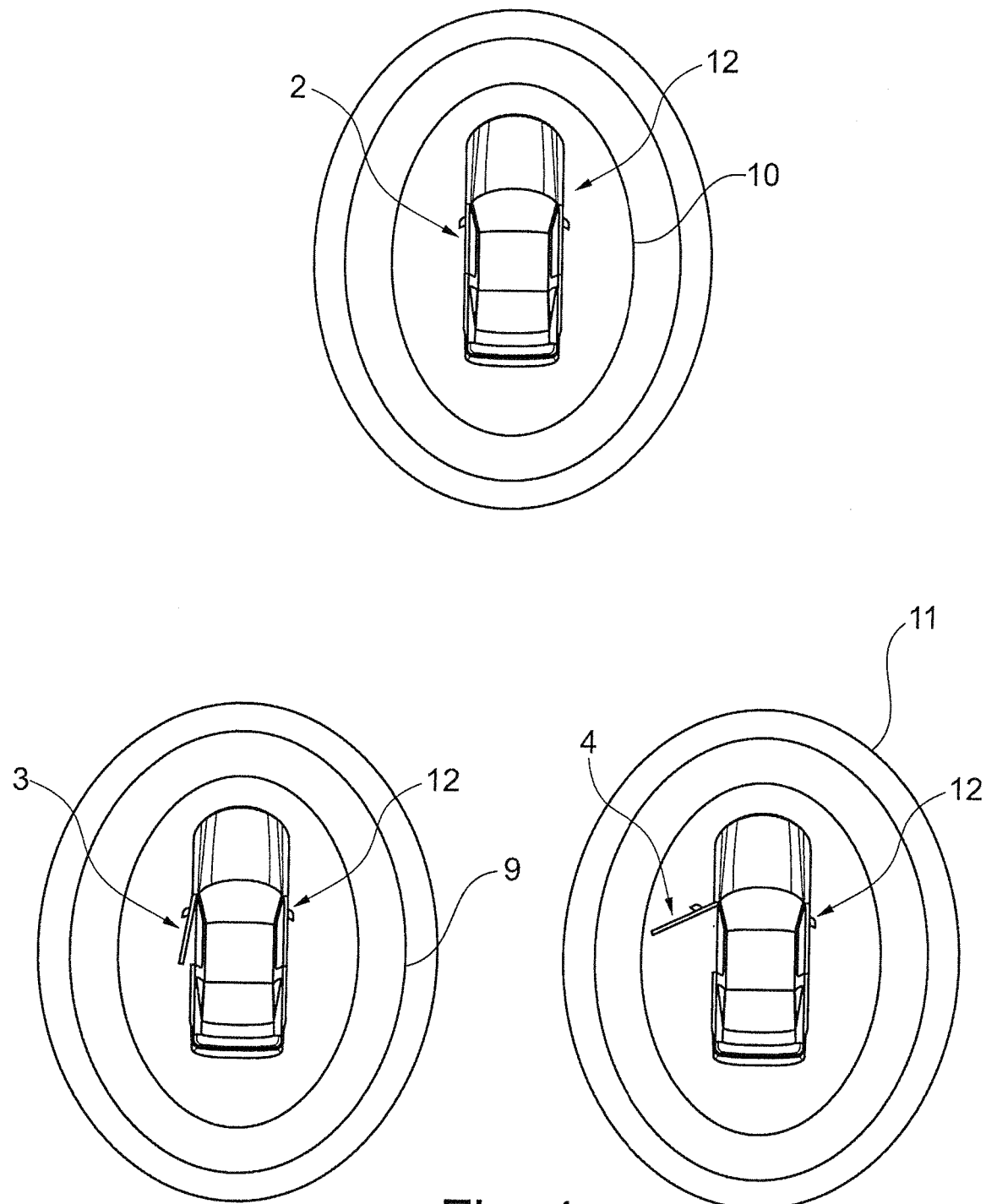
FIG. 4 an illustration of the different door positions inside the proximity zones.

In the described embodiment the access authorization is made by the key 5 or the smartphone 5' or the smartcard. A keyless entry is possible i.e. using a proximity sensor detecting and identifying an authorized device the key 5, the smartphone 5', the smartcard, etc. In this case the different door positions 2, 3, 4 can be associated to different, preferably configurable distances as shown in FIG. 4.

For example in the middle distance 9 the intermediate position 3 can be activated and in the near distance 10 the movement into the open end position 4 can be started. This movement can then be stopped by the user near by the door. On the other hand the movement from the open end position 4 or from the intermediate position 3 into the closed end position 2 can be started when the authorizing device or person is leaving the car 12, especially the spaced distance 11. This distance can also be a welcome distance in which the car gives signals when the user is nearing to the car 12.

1 car door
2 closed end position
3 intermediate position
4 open end position
5 car key
5' smartphone
6 key button
7 key button
8 key button
9 middle distance
10 near distance
11 spaced distance
12 car

The invention claimed is:

1. A locking device for car doors without door handles, comprising:

an electronic control unit for authorization of access, the electronic control unit being connected to one or more sensors and/or to an antenna for wireless communication for communication with a smart device; and a driven mechanical lock/or unlock unit including a latching element for latching a closed end position of a car door, wherein the latching element is provided to block an intermediate position of the car door, into which the car door is movable dependent on a correct access authorization and wherein the intermediate position of the car door enables a grip behind an outside surface of the car door to unlock the intermediate position of the car door by actuation of a sensor and to allow further movement of the car door into an open end position;

a separate signaling device located in a narrow side of the car door, the separate signaling device providing a signal on the car door when the car door is in the intermediate position and the signal on the car door is only visible when the car door is in the intermediate position and the separate signaling device is sealed when the car door is in the closed position such that the separate signaling device is sealed against an outer environment of the car door in the closed end position.

2. The locking device according to claim 1, wherein driving means is provided for movement of the car door from the closed end position into the intermediate position.

3. The locking device according to claim 1, wherein an electronic control unit is provided to initiate movement of the car door from the closed end position into the intermediate position dependent on an appearing proximity signal and a correct access authorization.

4. The locking device according to claim 1, wherein driving means is provided for movement of the car door from the intermediate position into the open end position.

5. The locking device according to claim 1, wherein driving means is provided for movement of the car door from the intermediate position and/or the open end position into the closed end position.

6. The locking device according to claim 1, wherein a motor or a spring or an air bottle is provided for at least one movement of the car door.

7. The locking device according to claim 1, wherein the electronic control unit is adopted to move the car door from the intermediate position into the closed end position dependent on one or more defined closing criteria.

8. The locking device according to claim 7, wherein a time interval without door movement and/or a disappearing proximity signal and/or an operation of a close sensor and/or a closing signal via a wireless communication is used as the one or more defined closing criteria.

9. The locking according to claim 1, wherein a control unit is adopted to generate a light signal and/or an acoustic signal using lamps of the car and/or a horn of the car to indicate the intermediate position of the car door.

10. The locking device according to claim 9, wherein the separate signaling device has a light source and a control unit for generating at least one light signal, which is visible in the intermediate position of the car door.

11. The locking device as in claim 1, wherein the one or more sensors are at least one of the following: a proximity sensor, a touch sensor, and a radio transmitter and the antenna is a near field communication antenna and the smart device is at least one of the following: a smart card, a mobile phone, a smart watch, and a smart key.

* * * * *